United States Patent
Bhalerao

(10) Patent No.: US 9,454,514 B2
(45) Date of Patent: Sep. 27, 2016

(54) LOCAL LANGUAGE NUMERAL CONVERSION IN NUMERIC COMPUTING

(75) Inventor: Rahul Pandit Bhalerao, Maharashtra (IN)

(73) Assignee: Red Hat, Inc., Raleigh, NC (US)

( * ) Notice: Subject to any disclaimer, the term of this patent is extended or adjusted under 35 U.S.C. 154(b) by 1280 days.

(21) Appl. No.: 12/611,051

(22) Filed: Nov. 2, 2009

(65) Prior Publication Data

US 2011/0054881 A1    Mar. 3, 2011

(51) Int. Cl.
*G06F 17/28*    (2006.01)
*G06F 17/22*    (2006.01)
*G06F 17/21*    (2006.01)

(52) U.S. Cl.
CPC ........... *G06F 17/2223* (2013.01); *G06F 17/28* (2013.01); *G06F 17/2863* (2013.01); *G06F 17/211* (2013.01)

(58) Field of Classification Search
USPC .............. 704/1–10; 708/112, 130–132, 138, 708/144–145, 160–161, 170–171, 204
See application file for complete search history.

(56) References Cited

U.S. PATENT DOCUMENTS

| | | | | |
|---|---|---|---|---|
| 4,012,725 A | * | 3/1977 | Spangler et al. | 708/130 |
| 4,180,854 A | * | 12/1979 | Walden et al. | 708/130 |
| 4,193,119 A | * | 3/1980 | Arase et al. | 704/2 |
| 4,406,626 A | | 9/1983 | Anderson et al. | |
| 4,829,580 A | * | 5/1989 | Church | 704/260 |
| 4,974,191 A | * | 11/1990 | Amirghodsi | G06F 17/277 380/1 |
| 5,091,950 A | * | 2/1992 | Ahmed | 704/277 |
| 5,251,292 A | * | 10/1993 | Martel et al. | 715/236 |
| 5,337,233 A | * | 8/1994 | Hofert et al. | 715/234 |
| 5,396,588 A | * | 3/1995 | Froessl | G06F 17/30253 382/217 |
| 5,617,488 A | * | 4/1997 | Hong | G06K 9/726 382/209 |
| 5,657,259 A | * | 8/1997 | Davis et al. | 708/204 |
| 5,717,939 A | * | 2/1998 | Bricklin et al. | 715/212 |
| 5,724,449 A | * | 3/1998 | Cornerford | G06F 3/04883 345/163 |
| 5,758,314 A | * | 5/1998 | McKenna | 704/8 |
| 5,787,452 A | * | 7/1998 | McKenna | 715/234 |

(Continued)

FOREIGN PATENT DOCUMENTS

IN    2103/CHE/2009    3/2011
IN    2129/CHE/2009    3/2011

OTHER PUBLICATIONS

"Unicode Issues." LanguageGeek.com. <http://languagegeek.com/issues/unicode.html>. Published Oct. 3, 2003. Archived version accessed Sep. 22, 2012.*

(Continued)

*Primary Examiner* — Pierre-Louis Desir
*Assistant Examiner* — David Kovacek
(74) *Attorney, Agent, or Firm* — Lowenstein Sandler LLP

(57) ABSTRACT

A mechanism for local language numeral conversion in dynamic numeric computing is disclosed. A method of embodiments of the invention includes receiving a string array of numeric data in a local language, wherein the numeric data used in dynamic calculations performed by the application, converting characters of the string array of numeric data from local language characters to corresponding English digits in an American Standard Code for Information Interchange (ASCII) format by utilizing a number conversion matrix, and providing the English digits in the ASCII format to a processing function of the application for use with the dynamic calculations of the application.

17 Claims, 6 Drawing Sheets

(56) References Cited

U.S. PATENT DOCUMENTS

| | | | |
|---|---|---|---|
| 5,898,874 A * | 4/1999 | Gelfenbain .................. 717/140 |
| 5,940,790 A * | 8/1999 | Vesterinen ........................ 704/8 |
| 5,982,303 A * | 11/1999 | Smith ............................ 341/22 |
| 6,005,498 A | 12/1999 | Yang et al. |
| 6,029,171 A | 2/2000 | Smiga et al. |
| 6,111,572 A * | 8/2000 | Blair et al. .................... 715/703 |
| 6,141,005 A * | 10/2000 | Hetherington et al. ...... 715/866 |
| 6,157,905 A * | 12/2000 | Powell .............................. 704/2 |
| 6,185,729 B1 * | 2/2001 | Watanabe ............ G06F 9/4448 704/3 |
| 6,314,469 B1 * | 11/2001 | Tan et al. ...................... 709/245 |
| 6,446,133 B1 * | 9/2002 | Tan .................... H04L 61/1511 704/8 |
| 6,560,659 B1 * | 5/2003 | Tobias et al. ...................... 710/8 |
| 6,631,501 B1 * | 10/2003 | Jurion et al. .................. 715/257 |
| 6,658,626 B1 * | 12/2003 | Aiken .......................... 715/205 |
| 6,708,310 B1 * | 3/2004 | Sung et al. ................... 715/210 |
| 6,771,751 B1 * | 8/2004 | Kasturi .................. H04L 12/66 341/173 |
| 6,869,018 B2 | 3/2005 | Fifield et al. |
| 6,928,438 B2 * | 8/2005 | Daray ....................... G06F 7/08 |
| 6,957,385 B2 * | 10/2005 | Chan et al. ................... 715/220 |
| 6,986,104 B2 * | 1/2006 | Green et al. .................. 715/234 |
| 7,013,289 B2 * | 3/2006 | Horn et al. ................. 705/14.51 |
| 7,143,350 B2 | 11/2006 | Jurion et al. |
| 7,177,793 B2 * | 2/2007 | Barker et al. ...................... 704/8 |
| 7,299,452 B1 * | 11/2007 | Zhang ................ G06F 17/2223 704/8 |
| 7,516,062 B2 * | 4/2009 | Chen et al. ........................ 704/3 |
| 7,584,089 B2 * | 9/2009 | Kuwata ............... G06F 17/2217 704/257 |
| 7,702,502 B2 | 4/2010 | Ricci et al. |
| 7,797,360 B2 * | 9/2010 | Kretzschmar ............. G06F 7/38 708/204 |
| 7,809,697 B1 * | 10/2010 | Kanefsky et al. ............ 707/693 |
| 7,865,355 B2 * | 1/2011 | Xu et al. ........................... 704/8 |
| 7,895,560 B2 * | 2/2011 | Lovell .................... G06F 15/76 708/130 |
| 7,930,642 B1 | 4/2011 | Gerde et al. |
| 8,081,090 B2 * | 12/2011 | Wu .......................... G06F 3/023 341/20 |
| 8,326,595 B2 | 12/2012 | Bhalerao |
| 2001/0025320 A1 * | 9/2001 | Seng et al. .................... 709/245 |
| 2002/0143521 A1 * | 10/2002 | Call .................................. 704/1 |
| 2002/0152258 A1 * | 10/2002 | Zhou ............................. 709/201 |
| 2003/0009653 A1 * | 1/2003 | Esbensen ...................... 712/220 |
| 2003/0119551 A1 | 6/2003 | Laukkanen et al. |
| 2003/0126128 A1 * | 7/2003 | Watson ............... G06F 17/218 |
| 2003/0195741 A1 * | 10/2003 | Mani et al. ....................... 704/8 |
| 2003/0202832 A1 | 10/2003 | Lorenzo |
| 2003/0212527 A1 * | 11/2003 | Moore et al. ................. 702/179 |
| 2004/0006741 A1 * | 1/2004 | Radja et al. .................. 715/513 |
| 2005/0005266 A1 * | 1/2005 | Datig ............................ 717/136 |
| 2005/0125731 A1 * | 6/2005 | Jurion et al. .................. 715/536 |
| 2005/0195171 A1 | 9/2005 | Aoki et al. |
| 2005/0197825 A1 * | 9/2005 | Hagerman et al. ............... 704/2 |
| 2005/0283726 A1 | 12/2005 | Lunati |
| 2006/0074987 A1 * | 4/2006 | Bitsch ............... G06F 17/30985 |
| 2006/0080082 A1 * | 4/2006 | Ravindra et al. .................. 704/8 |
| 2006/0126936 A1 | 6/2006 | Bhaskarabhatla |
| 2006/0184352 A1 * | 8/2006 | Chen et al. ....................... 704/2 |
| 2006/0217955 A1 | 9/2006 | Nagao et al. |
| 2006/0236237 A1 | 10/2006 | Peiro et al. |
| 2007/0033035 A1 | 2/2007 | Sharma et al. |
| 2008/0270111 A1 * | 10/2008 | Hanumanthappa ............... 704/3 |
| 2009/0172522 A1 | 7/2009 | Ichikawa |
| 2009/0240751 A1 * | 9/2009 | Renshaw et al. ............. 708/131 |
| 2009/0260060 A1 | 10/2009 | Smith et al. |
| 2010/0259561 A1 * | 10/2010 | Forutanpour ......... G06F 3/0216 345/660 |
| 2010/0262418 A1 * | 10/2010 | Musa ................................ 704/2 |
| 2011/0054881 A1 * | 3/2011 | Bhalerao ........................... 704/2 |
| 2011/0054882 A1 * | 3/2011 | Bhalerao et al. ................. 704/9 |
| 2012/0053926 A1 | 3/2012 | Satpute |

OTHER PUBLICATIONS

"Unicode, UTF, ASCII, ANSI format differences." StackOverflow.com <http://stackoverflow.com/questions/700187/unicode-utf-ascii-ansi-format-differences>. Published Apr. 12, 2009. Archived version accessed Sep. 23, 2012.*

Kuhn, Markus. "UTF-8 and Unicode FAQ for Unix/Linux." <http://www.cl.cam.ac.uk/~mgk25/unicode.html>. Accessed Aug. 8, 2015. Published Apr. 6, 1999.*

Kuhn, Markus. "UTF-8 and Unicode FAQ for Unix/Linux." <https://web.archive.org/web/19991012223236/http://www.cl.cam.ac.uk/~mgk25/unicode.html> Published Jun. 4, 1999. Archived Oct. 12, 1999. Accessed Jan. 10, 2016.*

Veena Dixit et al., "Design and Implementation of a Morphology-based Spellchecker for Marathi, an Indian Language", 6 pages, Oct. 2005, Archives of Control Sciences, vol. 15, No. 3, Special issue on Human Language Technologies as a challenge for Computer Science and Linguistics. Part I.

India Office Action, dated Jun. 10, 2015, in a corresponding application owned by Applicant (India Patent App. No. 2103/CHE/2009).

U.S. Appl. No. 12/612,649, Non-Final Office Action mailed on Jan. 30, 2012, 11 pages.

U.S. Appl. No. 12/612,649, Final Office Action mailed on May 17, 2012, 16 pages.

U.S. Appl. No. 12/612,649, Notice of Allowance mailed on Jul. 27, 2012, 8 pages.

* cited by examiner

200

```
NumMatrix=
[
[ 0,   1,   2,   3,   4,   5,   6,   7,   8,   9 ] //English-0    210

[ '०', '१', '२', '३', '४', '५', '६', '७', '८', '९' ] //Hindi-1    220

['〇','一','二','三','四','五','六','七','八','九'] //Chinese-2    230
]
```

*Fig. 2*

LOCAL LANGUAGE NUMERAL CONVERSION IN NUMERIC COMPUTING

RELATED APPLICATION

This application claims the benefit of priority to Indian Patent Application No. 2129/CHEN/2009, filed on Sep. 2, 2009, which is incorporated herein by reference in its entirety.

TECHNICAL FIELD

The embodiments of the invention relate generally to language conversion in numeric processing and, more specifically, relate to a mechanism for local language numeral conversion in dynamic numeric computing.

BACKGROUND

Language localization is the process of translating a product into different languages or adapting a language for a specific country or region. In the global market existing today, language localization is one of the most important features for any computing application. Static presentations of alphabetic text and numerals are amenable to translation operations and, as a result, are easily presented in local languages in computing applications. For example, with a static presentation of text of numerals, the localization operation would capture the text or numeric string, translate it to the local language, and then give it back to the application or user. As a result, the same application that was running is English is shown in a local language without having to create a different application altogether in that local language.

A problem arises whenever there is a dynamic numeric computation involved in a computing application, such as with a calculator application or a calendaring application. This is because there is no way to compute at the compiler level using local or local language numerals other than English. These dynamic computations cannot utilize the static translations described above due to the high overhead and complexity that would result. In addition, most of the numeric outputs on a computer display are dynamic computations and not static presentations, which only adds to the difficulties faced in presenting these applications in a local language.

The obvious result of this problem is that for any computing applications using dynamic computations, the dynamic numbers will be shown in English while any static text and numbers will be shown in the local language. For example, in a calendaring application in Hind, the month and day name will be shown in Hindi, while the date will be shown as an English numeral.

One possible solution to the above problem would be to modify the low-level compiler to be able to process non-English local language numeric data. However, this solution is highly inadequate and may even be impossible to do so in some cases. As such, a mechanism that allows the use of local language numerals for dynamic computation and interface display, without modify the compiler, would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 2 is a block diagram of an exemplary number conversion matrix used in an embodiment of the invention;

DETAILED DESCRIPTION

Figure 1:
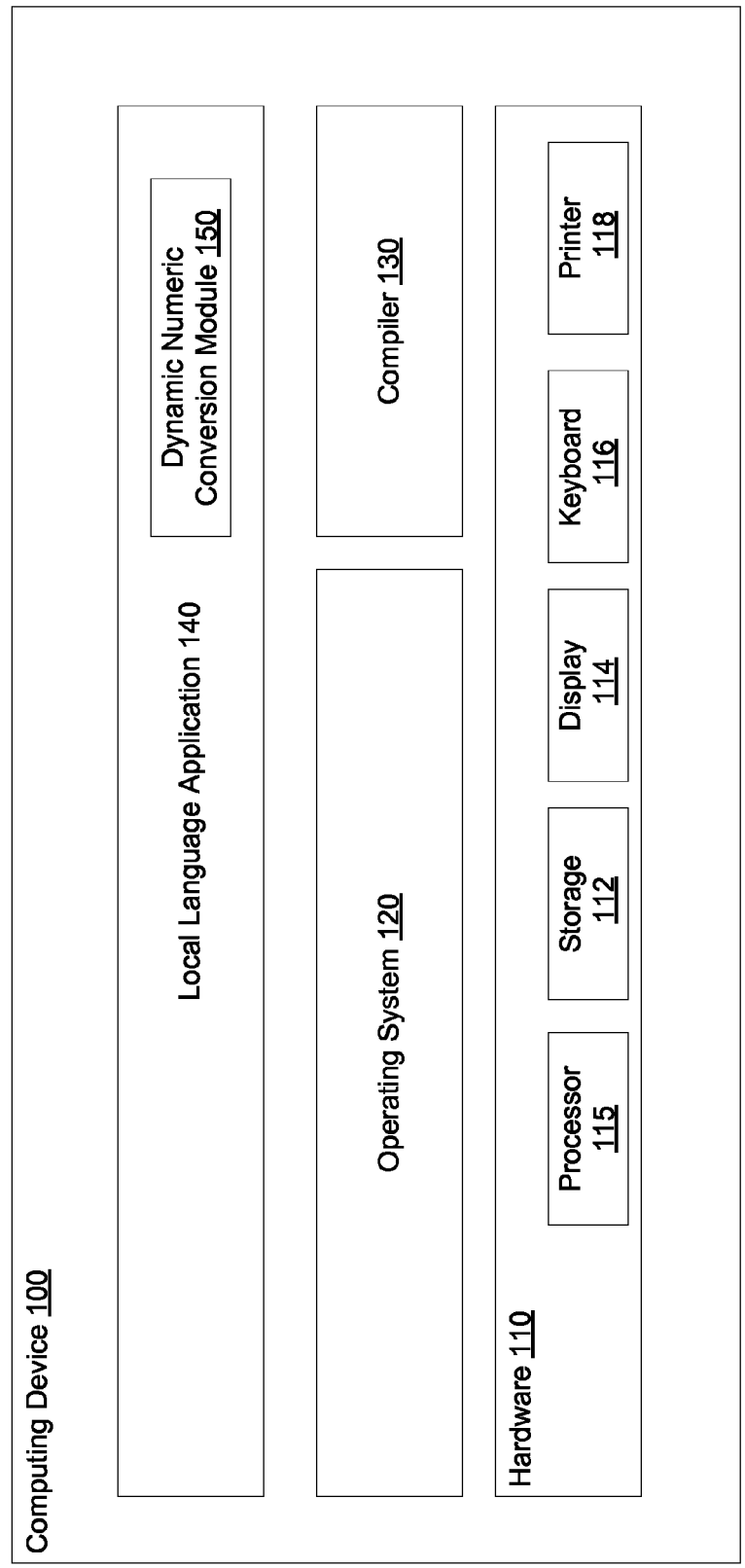
FIG. 1 is a block diagram of a computing device to perform dynamic numeral conversion for local languages according to an embodiment of the invention.

Embodiments of the invention provide a mechanism for local language numeral conversion in dynamic numeric computing. A method of embodiments of the invention includes receiving a string array of numeric data in a local language, wherein the numeric data used in dynamic calculations performed by the application, converting characters of the string array of numeric data from local language characters to corresponding English digits in an American Standard Code for Information Interchange (ASCII) format by utilizing a number conversion matrix, and providing the English digits in the ASCII format to a processing function of the application for use with the dynamic calculations of the application.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for local language numeral conversion in dynamic numeric computing. Embodiments of the invention provide a method to translate numerals of a local language other than English for dynamic computational purposes, surpassing the disability of compilers or low-level programming languages to process non-ASCII or non-English numerals. As a result of embodiments of the invention, any application that involves numeric data for input, process, and output will be able to completely use a local language as an interface language. This overcomes a low-level compiler's disability to process non-English numbers without having to make any changes to the compiler itself. This also makes local language computing possible, even for numeric data, with complete user transparency.

FIG. 1 is a block diagram of a computing device 100 to perform dynamic numeral conversion for local languages according to an embodiment of the invention. At the lowest-level, computing device 100 includes hardware 110, such as processor 115 and storage 112. Computing device 100 may further include peripheral devices, such as a display device 114, a keyboard, 116, and a printer 118. Operating on top of hardware 110 is an operating system 120, such as a Windows™ or Linux™-based operating system. Computing device 100 also includes a compiler 130 operating on top of hardware 110. Compiler 130 is a computer program (or set of programs) that transforms source code written in a computer language (the source language) into another computer language (the target language, often having a binary form known as object code).

Computing device 100 may also run a local language application 140 on top of and utilizing operating system 120 and compiler 130. In one embodiment, local language application 140 is a software application that is presented to an end user (not shown) with an interface in the local language of the end user. In one embodiment, the local language may include Hindi, Chinese, Hebrew, or Greek, for example. Any language utilizing decimal-based numerals may be used with embodiments of the invention and implemented as the language of choice for local language application 140.

Traditionally, in prior localization solutions, any dynamic numerals of local language application 140 were processed and shown to the end user in English, rather than in the end user's preferred local language. Dynamic numerals include any numerals used in the application 140 that are not static, or in other words, that require some sort of computation or calculation in order to be determined by the application. For example, if local language application 140 is a calculator application or a calendaring application, many dynamic numerals would be found in the application as they would not be known in the code of application, but rather are determined by calculation during operation of the application 140.

Dynamic numerals are not known prior to the application's 140 execution, and as such, are not easily lent to traditional language translation solutions in computing. This is because a compiler, such as compiler 130, used for compiling or decompiling the application 140 would only be able to process numerals in an English format. The compiler 130 would have to be modified to process non-English numerals, which would severely affect the efficiency and performance of the application. On the other hand, any static numerals found in local language application 140 (which are known and hard-coded into the application) can be easily translated with a straight-forward lookup operation upon the application's execution for localization purposes.

In one embodiment, local language application 140 includes a dynamic numeric conversion module 150 to provide a translation mechanism for dynamic numerals used in application 140, so that these numerals may be presented to an end user in the local language. Embodiments of the invention uses dynamic numeric conversion module 150 as a front-end and back-end translation interface for local language application 140 to a processing function performed by hardware 110 as directed by application 140. More specifically, dynamic numeric conversion module 150 converts any dynamic numerals used in application 140 from the specified end user local language to English, and vice versa, prior to and after any processing function performed on those dynamic numerals. In some embodiment, the end results of the conversion of dynamic numerals to the local language in application 140 may be displayed to the end user on display device 114 and/or printed by the end user on printer 118. Operations of the dynamic numeric conversion module 150 for local language application 140 are described in more detail in the following paragraphs.

FIG. 2 is a block diagram of an exemplary number conversion matrix 200 that may be used in an embodiment of the invention. Matrix 200 may be used for conversion between English numerals, Hindi numerals, and Chinese numerals utilizing algorithms of embodiments of the invention, such as methods 400 and 500 described below with respect to FIGS. 4 and 5. In some embodiments, decimal-based numerals of other languages may also be included in the number matrix and identified by the number of the next consecutive row in the matrix (e.g., "1" is for the Hindi language, "2" is for the Chinese language, "3" may be for another language with decimal-based numerals, and so on). As shown, each English numeral 210 matches up with its equivalent Hindi 220 or Chinese 230 numeral. Number matrix may be used to represent the conversion between English numerals 210 and any other decimal-based number system 220, 230 represented in another language than English.

Figure 3:
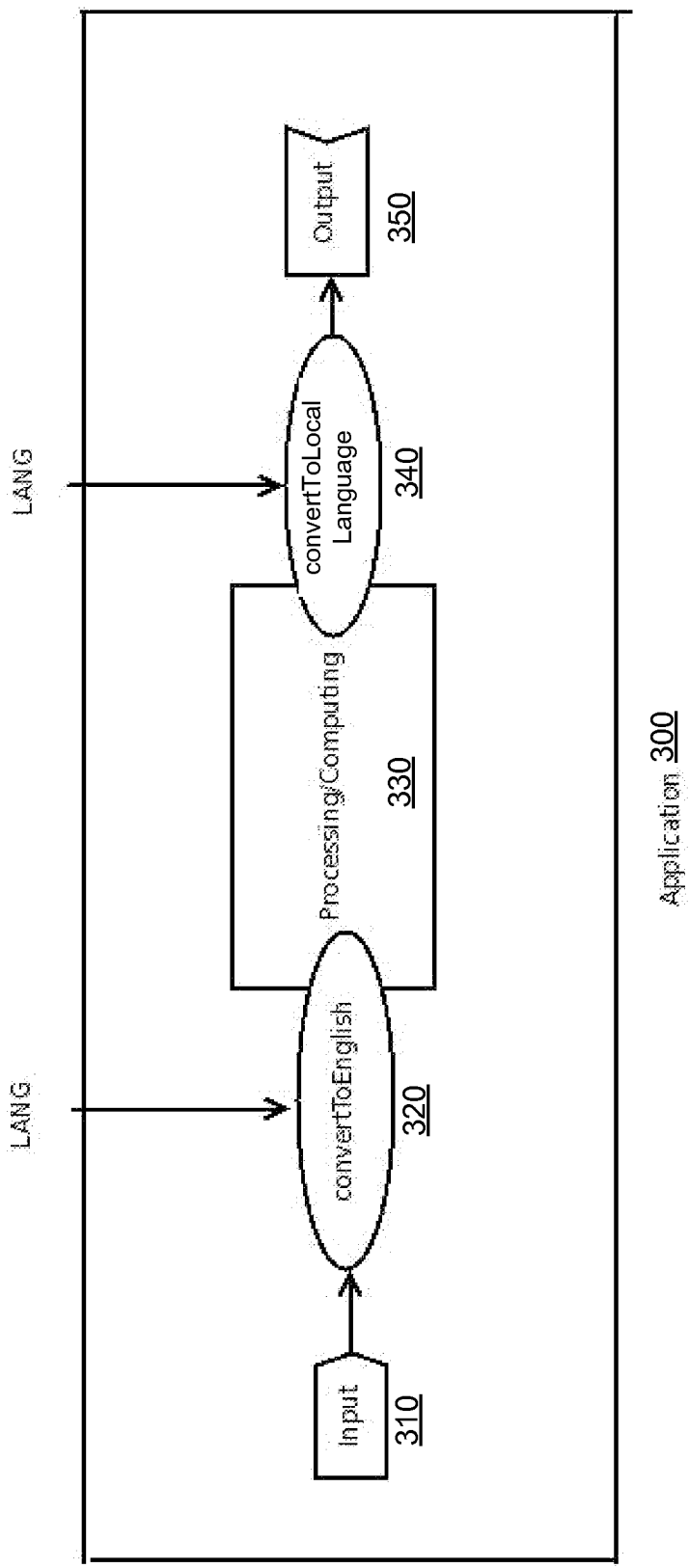
FIG. 3 is a diagram illustrating the operations of a local language application utilizing dynamic numeric conversion of embodiments of the invention.

FIG. 3 is a diagram illustrating the operations of a local language application 300 utilizing the dynamic numeric conversion of embodiments of the invention. In one embodiment, application 300 is the same as local language application 140 described with respect to FIG. 1.

Application 300 first receives an input dynamic numeral 310 in a local language of an end user. In one embodiment, input 310 is provided by an end user via keyboard 116 described with respect to FIG. 1. This input 310 is then passed to a convertToEnglish function 320. In one embodiment, the convertToEnglish function 320 is performed by dynamic numeric conversion module 150 described with respect to FIG. 1.

In one embodiment, the convertToEnglish function 320 also receives a 'LANG' value as an input. 'LANG' is the language of the interface performing the convertToEnglish function 320 and can hold the value either of 'English' or the local language (e.g., 'Hindi', 'Chinese', etc.). The convertToEnglish function 320 takes the input dynamic numeral and converts it to an English numeral.

In one embodiment, a process for converting the input dynamic local language numeral to English by convertToEnglish function 320 utilizing number conversion matrix 200 described with respect to FIG. 2 may be summarized as follows:
let 'i'=input local language dynamic numeral;
let num[i] =local language dynamic numeral in NumMatrix;
if num[i] ='.', return '.';
else, let indexed column of num[i] ='d';
return NumMatrix[0][d], where '0' corresponds to the English row of NumMatrix.

Further details of the specific operations of convertToEnglish function 320 are described below with respect to FIG. 4.

The converted numeral, now in English, is then passed to a processing/computing function 330 of the application. Processing/computing function 330 uses the English input dynamic numeric data for computing and/or calculation purposes and usually returns a different number than it received as a result. The result from processing/computing function 330 is then passed to a convertToLocalLanguage function 340.

The convertToLocalLanguage function 340 receives an English digit and converts that numeral to the corresponding local language numeral. The local language is determined by the input 'LANG' to the convertToLocalLanguage function 340. In one embodiment, a process for converting the English digit to a local language numeral by the convertToLocalLanguage function 340 utilizing number conversion matrix 200 described with respect to FIG. 2 may be summarized as follows:
let 'L' =index of row corresponding to the local language, 'LANG';
let num[i] =English digit in the NumMatrix;
if num[i] ='1', digit=1, return NumMatrix[L][1];
if num[i] ='2', digit=2, return NumMatrix[L][2];
if num[i] ='3', digit=3, return NumMatrix[L][3];
if num[i] ='4', digit=4, return NumMatrix[L][4];
if num[i] ='5', digit=5, return NumMatrix[L][5];
if num[i] ='6', digit=6, return NumMatrix[L][6];
if num[i] ='7', digit=7, return NumMatrix[L][7];
if num[i] ='8', digit=8, return NumMatrix[L][8];
if num[i] ='9', digit=9, return NumMatrix[L][9];
if num[i] ='0', digit=0, return NumMatrix[L][0];
if num[i] ='.', return '.'

Further details of the specific operations of convertToLocalLanguage function 340 are described below with respect to FIG. 5.

Lastly, the result of convertToLocalLanguage function 340 is passed to output 350 for presentation to the end user. In one embodiment, output 350 may be provided to the end user via display 114 described with respect to FIG. 1.

In one embodiment, whether or not to use the conversion functions 320, 340 in application 300 is dependent upon the current value of LANG and the settings of the application 300, which can be user-definable.

Figure 4:
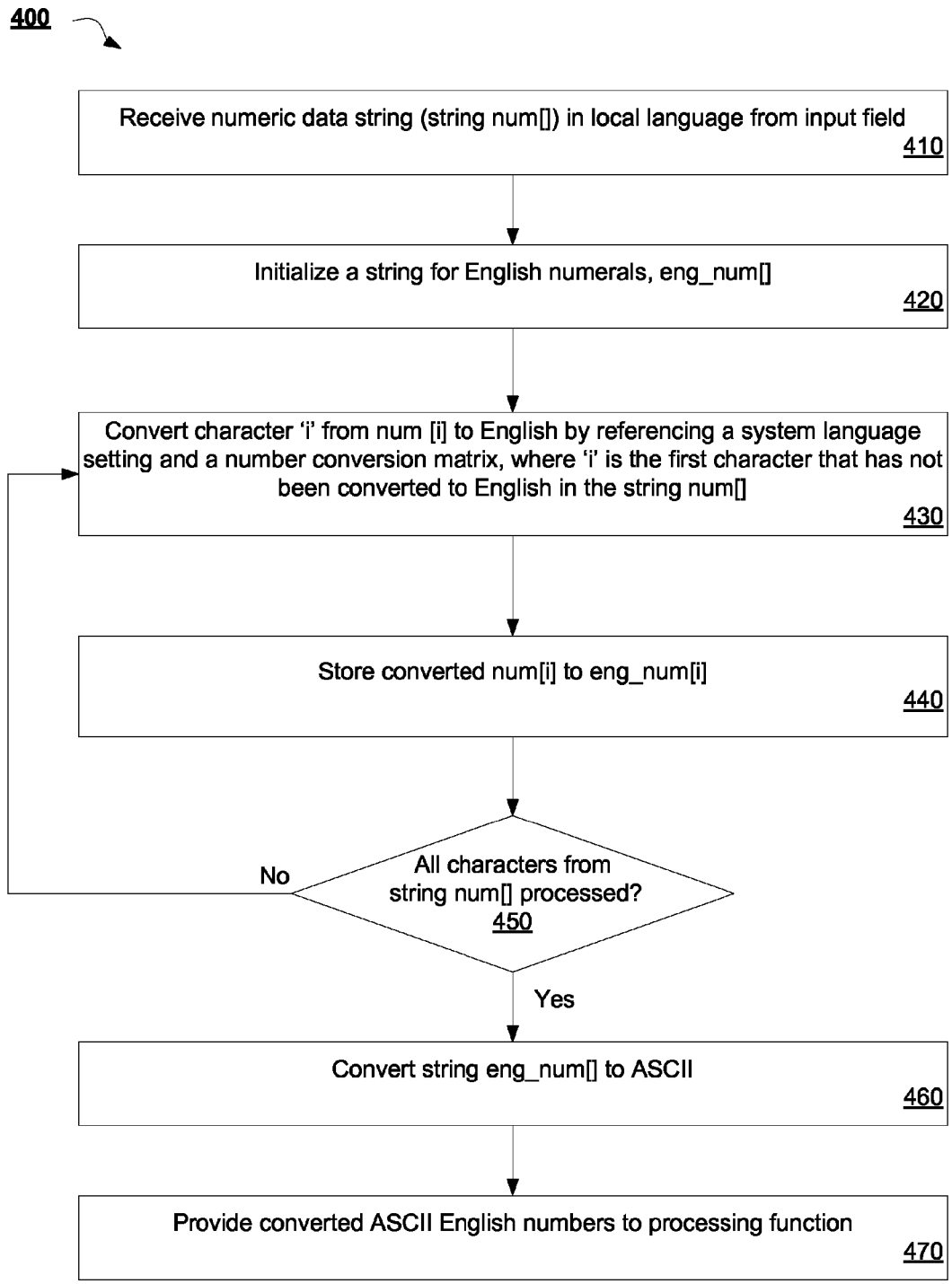
FIG. 4 is a flow diagram illustrating a method for an input-to-processing function of local language numeral conversion in dynamic numeric computing according to an embodiment of the invention.

FIG. 4 is a flow diagram illustrating a method 400 for an input-to-processing function of local language numeral conversion in dynamic numeric computing according to an embodiment of the invention. Method 400 receives a local language input numeral and converts that numeral to English for processing purposes. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by computing platform 100 of FIG. 1. In one embodiment, method 400 is the same as the convertToEnglish function 220 described with respect to FIG. 2.

Method 400 begins at block 410 where a numeric data string array in a local language is received from an input field of an application. In one embodiment, this numeric data string array is identified as string num[]. The use of a string array in embodiments of the invention is important because local language numbers will only be recognized as strings, not digits. At block 420, another string array is initialized to store English numerals. In one embodiment, this string array is identified as string eng_num[]. At block 430, a character 'i' from the local language string num [i] is converted to English by referencing a system language setting and a number conversion matrix that includes the local language numbers and corresponding English numbers. The character 'i' is the first character that has not been converted to English in the local language string num[]. The system language setting is the local language selected by an end user of the application implementing method 400.

In one embodiment, the number conversion matrix is the same as matrix 300 described with respect to FIG. 3. For example, in one embodiment, the number conversion matrix may be referenced to convert Hindi numerals to English numerals, as follows:
if num[i]='?', return '1';
if num[i]='?', return '2';
if num[i]='?', return '3';
if num[i]='?', return '4';

if num[i]='?', return '5';
if num[i]='?', return '6';
if num[i]='?', return '7';
if num[i]='?', return '8';
if num[i]='?', return '9';
if num[i]='?', return '0';
if num[i]='.', return '.'

Subsequently, at block 440, the converted num[i] from block 430 is stored to the English number string, for instance at eng_num[i]. At decision block 450, it is determined whether all of the local language characters from string num[] have been processed for conversion to English. If not, method 400 returns to block 430 to continue the string conversion to English. On the other hand, if all of the local language characters have been processed, then method 400 proceeds to block 460 where the English string, for example string eng_num[], is converted to ASCII format. Then, at block 470, the converted ASCII English numbers are provided to a processing function of the application for dynamic calculation and computation.

Figure 5:
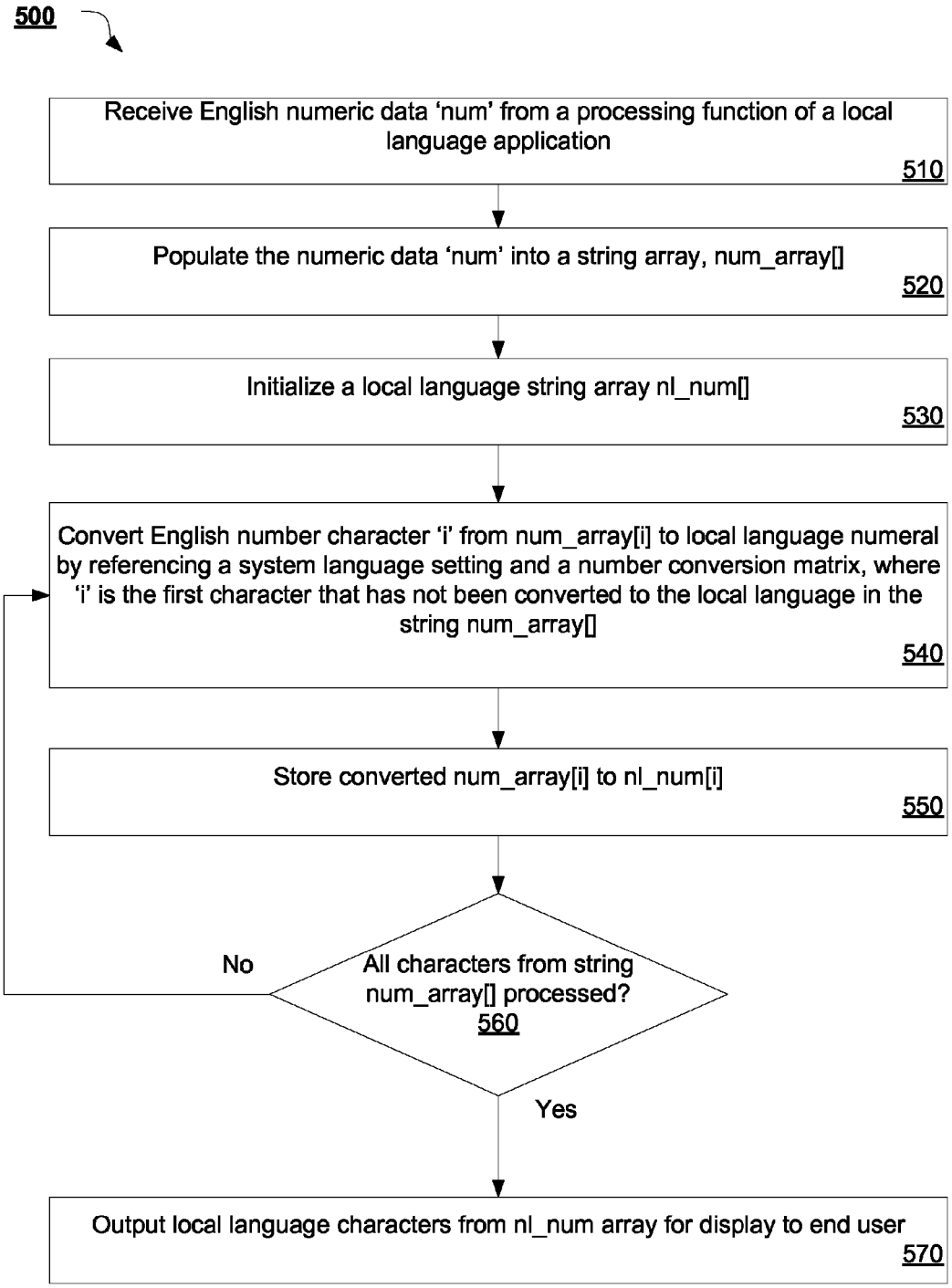
FIG. 5 is a flow diagram illustrating a method for a processing-to-output function of local language numeral conversion in dynamic numeric computing according to an embodiment of the invention.

FIG. 5 is a flow diagram illustrating a method 500 for a processing-to-output function of local language numeral conversion in dynamic numeric computing according to an embodiment of the invention. Method 500 receives English number output from a processing function of a local language application and converts those English numbers into local language numerals for viewing by an end user of the local language application. Method 500 may be performed by processing logic that may comprise hardware (e.g., circuitry, dedicated logic, programmable logic, microcode, etc.), software (such as instructions run on a processing device), or a combination thereof. In one embodiment, method 500 is performed by computing platform 100 of FIG. 1. In one embodiment, method 500 is the same as the convertToLocalLanguage function 240 described with respect to FIG. 2.

Method 500 begins at block 510 where English numeric data is received from a processing function of a local language application. This English numeric data may be known as 'num'. Then, at block 520, the English numeric data 'num' is populated into a string array, num_array[]. At block 530, another string array nl_num[] is initialized to store converted local language numeric characters.

Subsequently, at block 540, an English character 'i' from string array num_array (specifically character num_array[i]) is converted to a local language numeral by referencing a system language setting and a number conversion matrix. The character 'i' is the first character that has not been converted to the local language in the string num_array[]. The system language setting is the local language selected by an end user of the application implementing method 500.

In one embodiment, the number conversion matrix is the same as matrix 300 described with respect to FIG. 3. For example, in one embodiment, the number conversion matrix may be referenced to convert English numerals to Hindi numerals, as follows:

if num[i]='1', return '?';
if num[i]='2', return '?';
if num[i]='3', return '?';
if num[i]='4', return '?';
if num[i]='5', return '?';
if num[i]='6', return '?';
if num[i]='7', return '?';
if num[i]='8', return '?';
if num[i]='9', return '?';
if num[i]='0', return '?';
if num[i]='.', return '.'

At decision block 560 it is determined whether all English number characters from string num_array[] have been processed for conversion into the local language. If not, method 500 returns to block 540 to continue processing and converting the English characters of num_array[]. On the other hand, if all characters from num_array[] have been processed and converted, then the local language numeral characters in the string array nl_num[] are outputted for display to an end user of the application implementing method 500.

Figure 6:
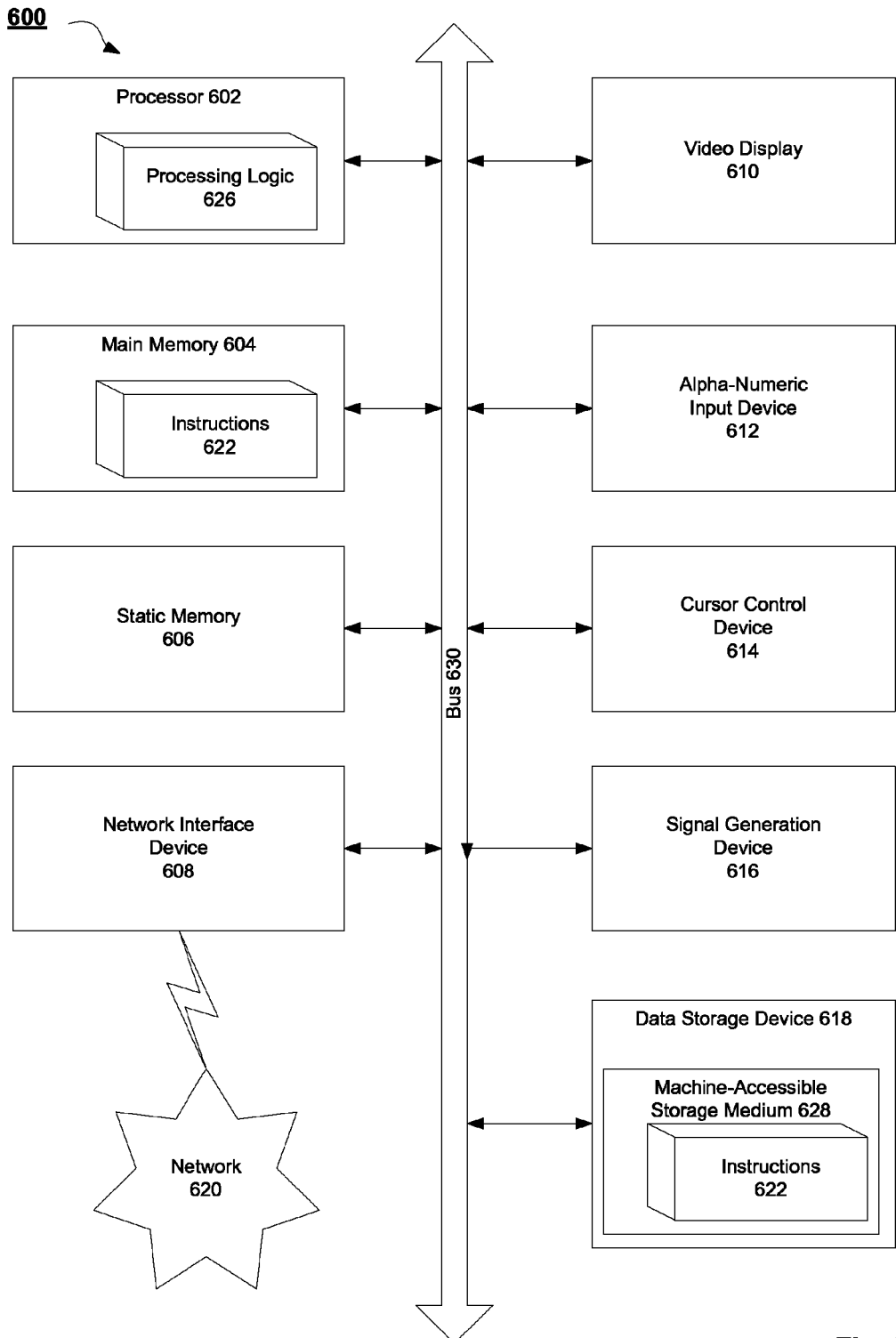
FIG. 6 illustrates a block diagram of one embodiment of a computer system.

FIG. 6 illustrates a diagrammatic representation of a machine in the exemplary form of a computer system 600 within which a set of instructions, for causing the machine to perform any one or more of the methodologies discussed herein, may be executed. In alterlocal embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628 on which is stored one or more set of instructions (e.g., software 622) embodying any one or more of the methodologies of functions described herein. The software 622 may also reside, completely or at least partially, within the main memory 604 and/or within the processing device 602 during execution thereof by the computer system 600; the main memory 604 and the processing device 602 also constituting machine-accessible storage media. The software 622 may further be transmitted or received over a network 620 via the network interface device 608.

The machine-readable storage medium 628 may also be used to stored instructions to perform local language numeral conversion in dynamic numeric computing, such as methods 400 and 500 described with respect to FIGS. 4 and 5, and/or a software library containing methods that call the above applications. While the machine-accessible storage medium 628 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   executing, by a processing device, a numeric conversion module as a front-end and back-end translation interface to an application executed by the processing device and compiled by a compiler, wherein the numeric conversion module is dedicated for use by the application and is not used by other applications executed by the processing device;
   receiving, by the processing device during runtime of the application, a string array of numeric data in a local language other than English wherein the numeric data is used in calculations performed by the application during runtime of the application to generate calculated numerals that are not known in code of the application during compilation of the application by the compiler;
   converting, by the processing device during the runtime of the application, characters of the string array of numeric data from local language characters not in English alphabet characters and not representable within the 128 characters of an American Standard Code for Information Interchange (ASCII) format into English alphabet digits representable by the 128 characters of ASCII format by utilizing a number conversion matrix;
   providing, by the processing device during the runtime of the application, the English alphabet digits in the ASCII format to a processing function of the application for use with the calculations of the application during the runtime of the application;
   performing, by the processing device during runtime of an application, the processing function for the application to calculate numerals as English alphabet digits in the ASCII format;
   converting, by the processing device during the runtime of the application, the calculated numerals to translated numeric data in the local language other than English by utilizing the number conversion matrix; and
   providing the translated numeric data to an end user of the application during the runtime of the application without modifying the compiler to process the numeric data in the local language other than English.

2. The method of claim 1, wherein providing the translated numeric data to the end user further comprises outputting the local language characters for display to the end user of the application.

3. The method of claim 1, wherein the number conversion matrix comprises a row of English numeric digits and one or more rows of corresponding local language numeric characters.

4. The method of claim 1, wherein the local language is Hindi.

5. The method of claim 1, wherein the string array of numeric data in a local language is not known prior to execution of the application.

6. The method of claim 1, wherein the converting characters of the string array of numeric data further comprises translating the local language characters to English numeric characters that are stored in another string array, and converting the another string array of English numeric characters to the ASCII format.

7. A system, comprising:
   a memory;
   a processing device communicably coupled to the memory, the processing device to execute a numeric conversion module as a front-end and back-end translation interface to an application executable from the memory by the processing device and compiled by a compiler, wherein the numeric conversion module is dedicated for use by the application and is not used by other applications executed by the processing device; and
   the processing device to execute the numeric conversion module to:
     receive, during runtime of the application, a string array of numeric data in a local language other than English, wherein the numeric data is used in calculations performed by the application during runtime of the application to generate calculated numerals that are not known in code of the application during compilation of the application by the compiler;
     convert, during the runtime of the application, characters of the string array of numeric data from local language characters not in English alphabet digits and not representable within the 128 characters of an American Standard Code for Information Interchange (ASCII) format into English alphabet digits representable by the 128 characters of the ASCII format by utilizing a number conversion matrix;
     provide, during the runtime of the application, the English digits in the ASCII format to a processing function of the application for use with the calculations of the application during the runtime of the application;

perform, during the runtime of an application, the processing function for the application to calculate numerals as English alphabet digits in the ASCII format;

convert, during the runtime of the application; the calculated numerals to translated numeric data in the local language other than English by utilizing the number conversion matrix; and provide the translated numeric data to an end user of the application during the runtime of the application without modifying the compiler to process the numeric data in the local language other than English.

8. The system of claim 7, wherein to provide the translated numeric data to the end user, the processing device is further to:

output the local language characters for display to the end user of the application.

9. The system of claim 7, wherein the number conversion matrix comprises a row of English numeric digits and one or more rows of corresponding local language numeric characters.

10. The system of claim 7, wherein the local language is Hindi.

11. The system of claim 7, wherein the string array of numeric data in a local language is not known prior to execution of the application.

12. A non-transitory machine-readable storage medium comprising instructions that, when accessed by a processing device, cause the processing device to:

execute, by the processing device, a numeric conversion module as a front-end and back-end translation interface to an application executed by the processing device and compiled by a compiler, wherein the numeric conversion module is dedicated for use by the application and is not used by other applications executed by the processing device;

receive, by the processing device during runtime of the application, a string array of numeric data in a local language other than English, wherein the numeric data is used in calculations performed by the during runtime of the application to generate calculated numerals that are not known in code of the application during compilation of the application by the compiler;

convert, by the processing device during the runtime of the application, characters of the string array of numeric data from local language characters not in English alphabet digits and not representable within the 128 characters of an American Standard Code for Information Interchange (ASCII) format into English alphabet digits representable by the 128 characters of the ASCII format by utilizing a number conversion matrix;

provide, by the processing device during the runtime of the application, the English alphabet digits in the ASCII format to a processing function of the application for use with the calculations of the application during the runtime of the application;

perform, by the processing device during the runtime of an application, the processing function for the application to calculate numerals as English alphabet digits in the ASCII format;

convert, by the processing device during the runtime of the application; the calculated numerals to translated numeric data in the local language other than English by utilizing the number conversion matrix; and provide the translated numeric data to an end user of the application during the runtime of the application without modifying the compiler to process the numeric data in the local language other than English.

13. A non-transitory machine-readable storage medium comprising instructions that, when accessed by a processing device, cause the processing device to:

execute, by the processing device, a numeric conversion module as a front-end and back-end translation interface to an application executed by the processing device and compiled by a compiler, wherein the numeric conversion module is dedicated for use by the application and is not used by other applications executed by the processing device;

receive, by the processing device during runtime of the application, a string array of numeric data in a local language other than English, wherein the numeric data is used in calculations performed by the during runtime of the application to generate calculated numerals that are not known in code of the application during compilation of the application by the compiler;

convert, by the processing device during the runtime of the application, characters of the string array of numeric data from local language characters not in English alphabet digits and not representable within the 128 characters of an American Standard Code for Information Interchange (ASCII) format into English alphabet digits representable by the 128 characters of the ASCII format by utilizing a number conversion matrix;

provide, by the processing device during the runtime of the application, the English alphabet digits in the ASCII format to a processing function of the application for use with the calculations of the application during the runtime of the application;

perform, by the processing device during the runtime of an application, the processing function for the application to calculate numerals as English alphabet digits in the ASCII format;

convert, by the processing device during the runtime of the application; the calculated numerals to translated numeric data in the local language other than English by utilizing the number conversion matrix; and provide the translated numeric data to an end user of the application during the runtime of the application without modifying the compiler to process the numeric data in the local language other than English.

14. The non-transitory machine-readable storage medium of claim 13, wherein to provide the translated numeric data to the end user further comprises the processing device to output the local language characters for display to the end user of the application.

15. The non-transitory machine-readable storage medium of claim 13, wherein the number conversion matrix comprises a row of English numeric digits and one or more rows of corresponding local language numeric characters.

16. The non-transitory machine-readable storage medium of claim 13, wherein the local language is Hindi.

17. The non-transitory machine-readable storage medium of claim 13, wherein to convert characters of the string array of numeric data further comprises the processing device to translate the local language characters to English numeric characters that are stored in another string array, and converting the another string array of English numeric characters to the ASCII format.

* * * * *